United States Patent [19]
Barker et al.

[11] Patent Number: 5,672,446
[45] Date of Patent: Sep. 30, 1997

[54] LITHIUM ION ELECTROCHEMICAL CELL

[75] Inventors: Jeremy Barker; Jeffrey Swoyer; J. Lee Morris; Wade Guindy; Frederik Flemming, all of Henderson, Nev.

[73] Assignee: Valence Technology, Inc., Henderson, Nev.

[21] Appl. No.: 592,981

[22] Filed: Jan. 29, 1996

[51] Int. Cl.$^6$ ............................................. H01M 4/58
[52] U.S. Cl. .................................... 429/218; 29/623.1
[58] Field of Search .................... 429/218, 232; 29/623.1

[56] References Cited

U.S. PATENT DOCUMENTS

| | | | |
|---|---|---|---|
| 4,497,883 | 2/1985 | Murray | 429/194 |
| 5,028,500 | 7/1991 | Fong et al. | 429/194 |
| 5,069,683 | 12/1991 | Fong et al. | 29/623.1 |
| 5,244,757 | 9/1993 | Takami et al. | 429/194 |
| 5,340,670 | 8/1994 | Takami et al. | 429/194 |
| 5,344,724 | 9/1994 | Ozaki et al. | 429/94 |
| 5,451,477 | 9/1995 | Omaru et al. | 429/218 |
| 5,522,127 | 6/1996 | Ozaki | 29/623.5 |

FOREIGN PATENT DOCUMENTS

| | | |
|---|---|---|
| 0 573 266 A1 | 12/1993 | European Pat. Off. . |
| 0 627 776 A2 | 12/1994 | European Pat. Off. . |
| 0 652 602 A2 | 5/1995 | European Pat. Off. . |

OTHER PUBLICATIONS

J. Barker, "Three Electrode Electrochemical Voltage Spectroscopy (TEVS): Evaluation of a Model Lithium Ion System", (1995) Electrochimica Acta, vol. 40, No. 11, pp. 1603–1608 (month n/a).

A. Mabuchi, "Charge–Discharge Mechanism of Graphitized Mesocarbon Microbeads", (1995), J. Electrochem. Soc., vol. 142, No. 9, pp. 3049–3051 (Month n/a).

A. Mabuchi, "Charge–Discharge Characteristics of the Mesocarbon Miocrobeads Heat–Treated at Different Temperatures", (1995), J. Electrochem. Soc., vol. 142, No. 4, (month n/a).

N. Takami, "Structural and Kinetic Characterization of Lithium Intercalation into Carbon Anodes for Secondary Lithium Batteries", (1995) J. Electrochem. Soc., vol. 142, No. 2, pp. 371–378 (month n/a).

*Primary Examiner*—Stephen Kalafut
*Assistant Examiner*—Jonathan S. Krueger
*Attorney, Agent, or Firm*—Robert Krebs; Charles Jew

[57] ABSTRACT

Non-aqueous solid electrochemical cells with improved performance can be fabricated by employing intercalation based carbon anodes comprising a mixture of carbon particles having different morphologies and selected from platelet-type, microbead-type and/or fiber-type structures. The anodes exhibit good cohesion and adhesion characteristics. When employed in an electrochemical cell, the anode can attain a specific electrode capacity of at least 300 mAh/g. The electrochemical cell has a cycle life of greater than 1000 cycles, and has a first cycle capacity loss of only about 5–15%.

24 Claims, 4 Drawing Sheets

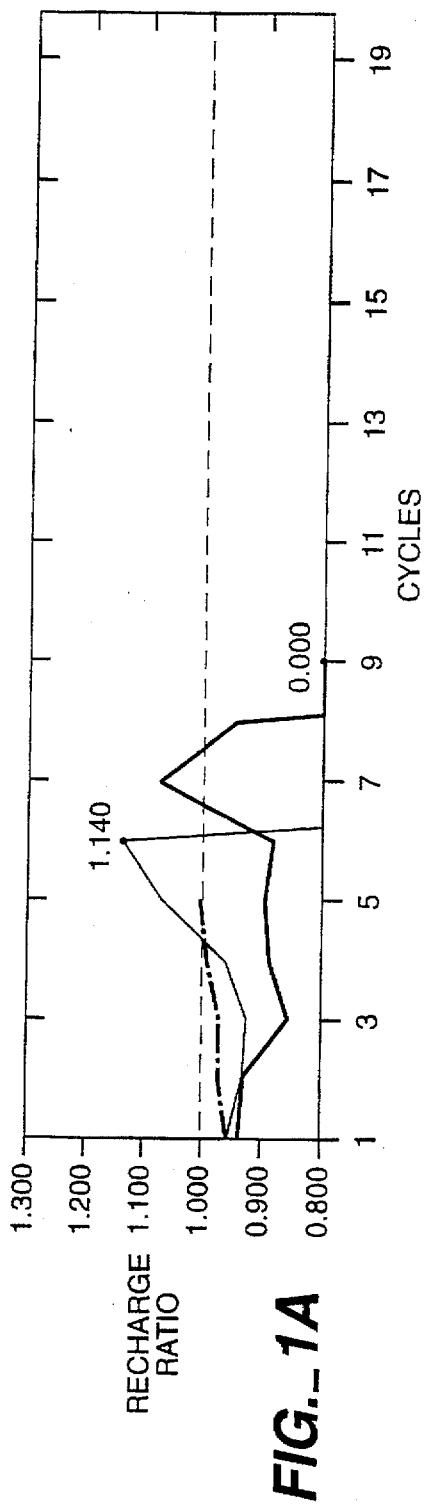
FIG._1A
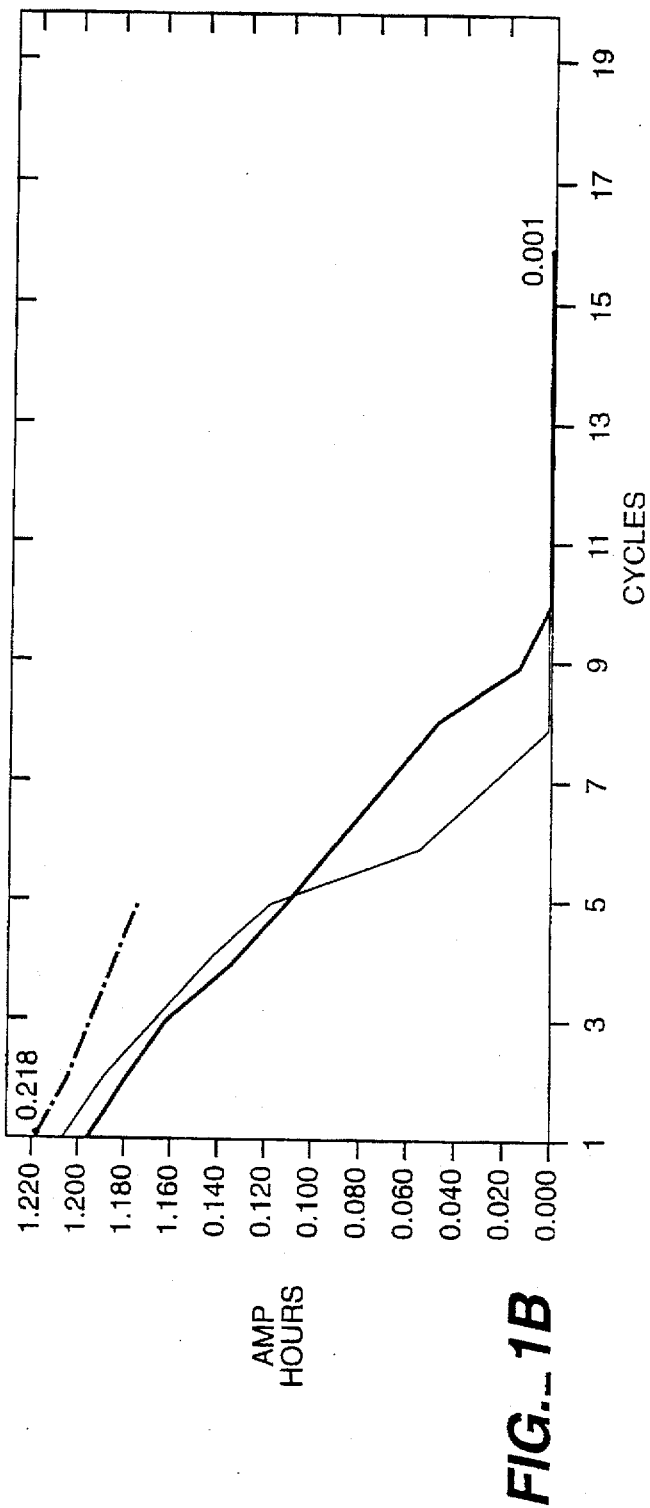
FIG._1B

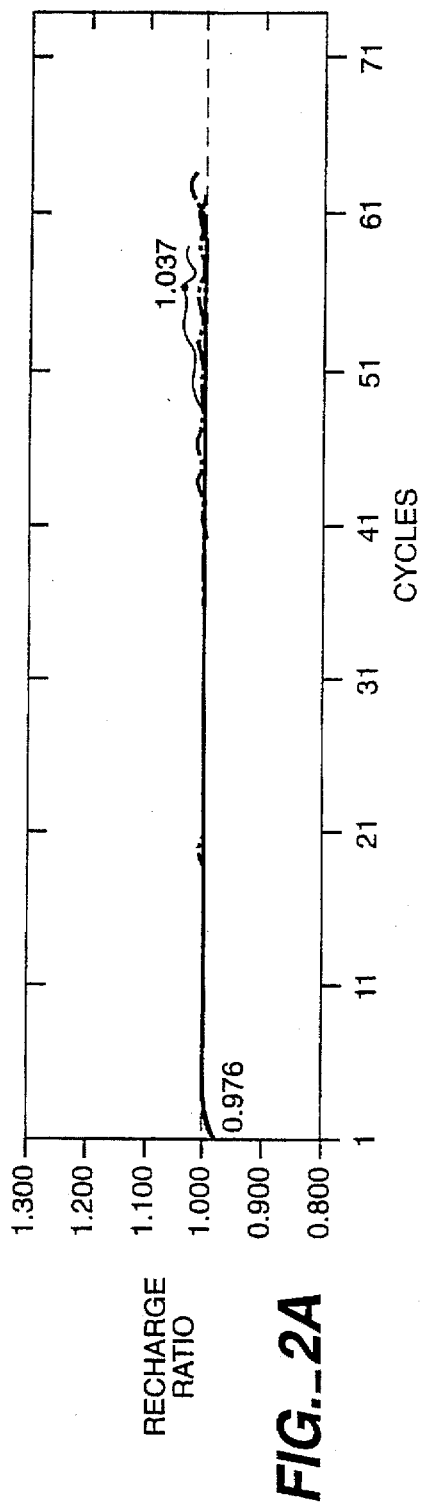
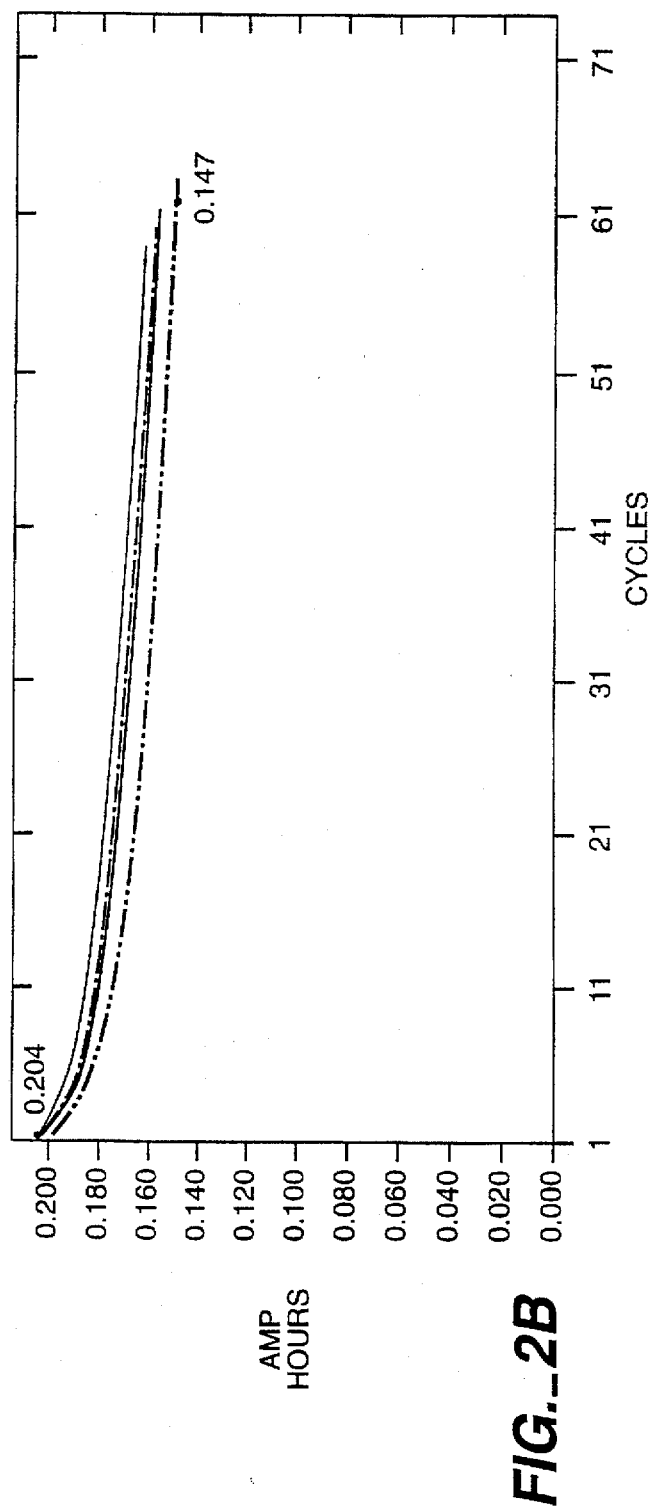
FIG._2A
FIG._2B

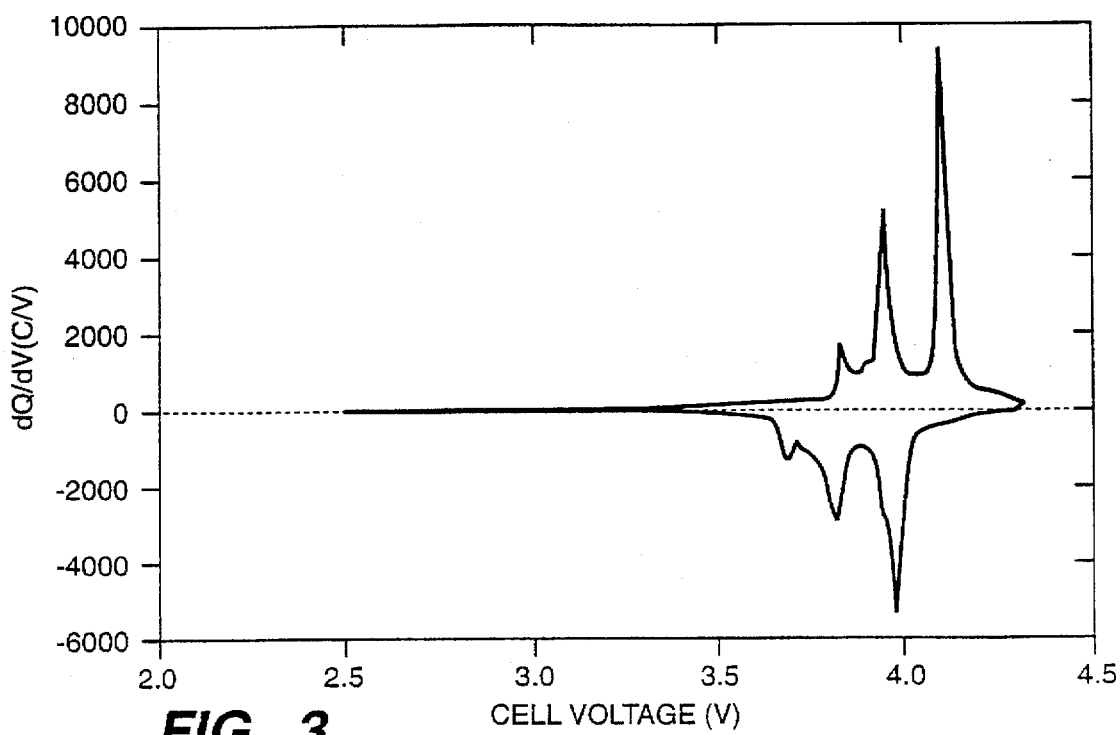
FIG._3
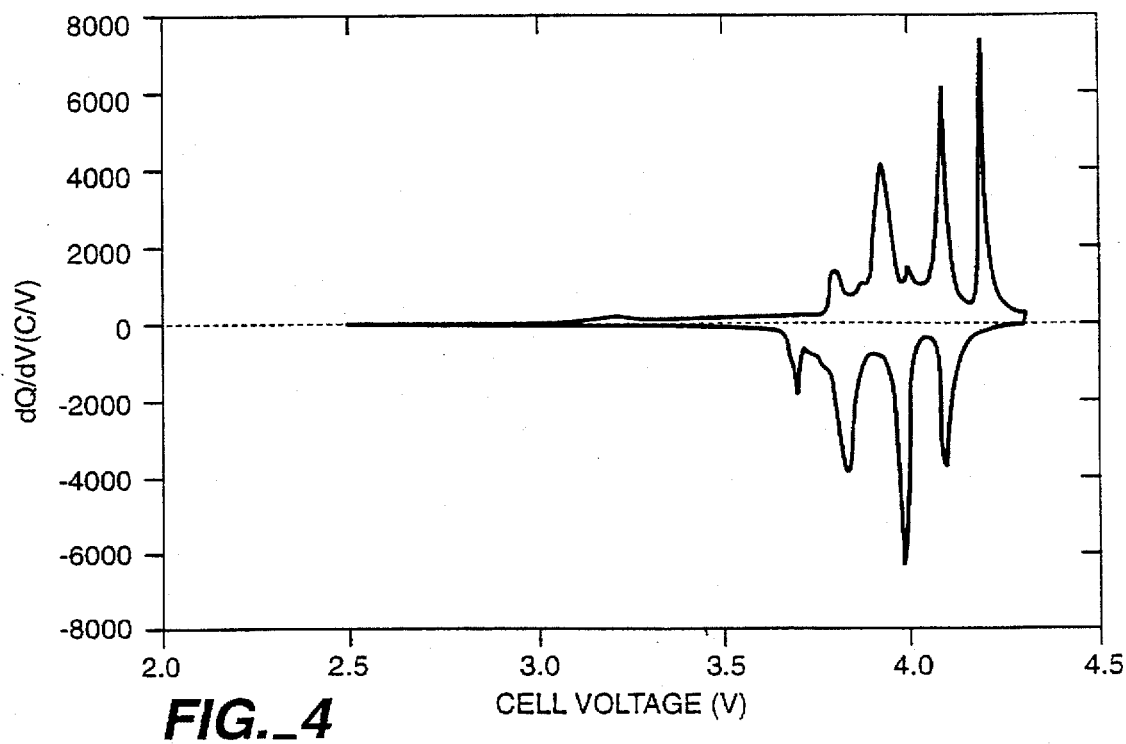
FIG._4

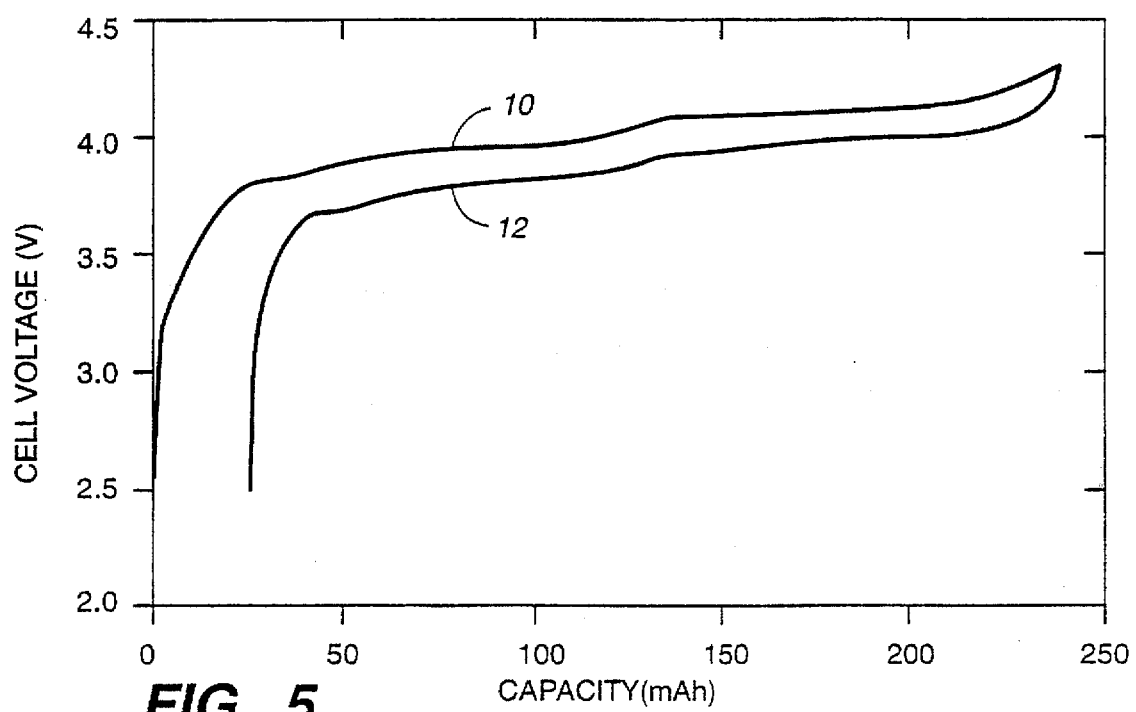
FIG._5
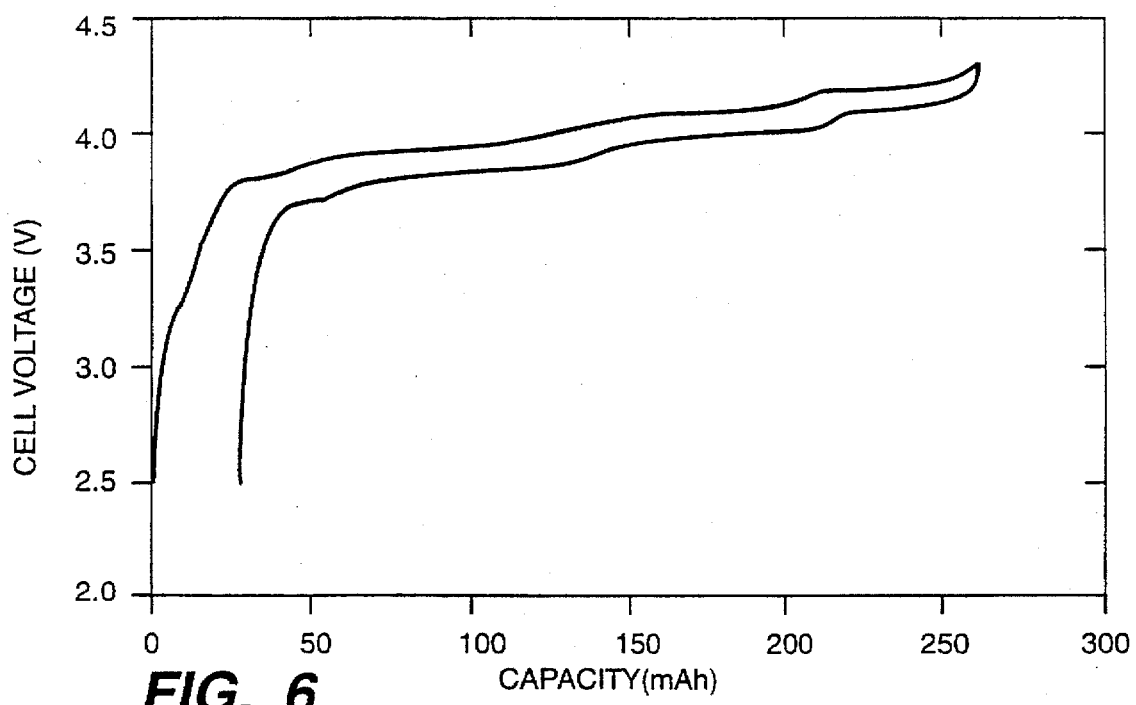
FIG._6

LITHIUM ION ELECTROCHEMICAL CELL

FIELD OF THE INVENTION

The present invention relates to electrochemical devices and, more particularly, to non-aqueous electrochemical cells demonstrating improved performance.

BACKGROUND OF THE INVENTION

Non-aqueous lithium electrochemical cells typically include an anode, a lithium electrolyte prepared from a lithium salt dissolved in one or more organic solvents and a cathode of an electrochemically active material, typically a chalcogenide of a transition metal. During discharge, lithium ions from the anode pass through the liquid electrolyte to the electrochemically active material of the cathode where the ions are taken up with the simultaneous release of electrical energy. During charging, the flow of ions is reversed so that lithium ions pass from the electrochemically active cathode material through the electrolyte and are plated back onto the lithium anode.

Recently, the lithium metal anode has been replaced with a carbon anode such as coke or graphite intercalated with lithium ions to form $Li_xC$. In operation of the cell, lithium passes from the carbon through the electrolyte to the cathode where it is taken up just as in a cell with a metallic lithium anode. During recharge, the lithium is transferred back to the anode where it reintercalates into the carbon. Because no metallic lithium is present in the cell, melting of the anode does not occur even under abuse conditions. Also, because lithium is reincorporated into the anode by intercalation rather than by plating, dendritic and spongy lithium growth does not occur. Non-aqueous lithium electrochemical cells are discussed in U.S. Pat. Nos. 4,472,487, 4,668,595 and 5,028,500.

Carbon anodes often do not possess sufficient structural integrity. For instance, if the carbon materials do not bind to each other adequately, the anode will essentially fall apart. In other cases, the anode may not adhere to the metal current collector. These cohesion and/or adhesion problems result in a reduced in electrochemical performance.

In view of the above shortcomings associated with the prior art, there is a need for non-aqueous electrochemical devices that are capable of providing improved performance, including better cycle life, specific electrode capacities, and energy density.

SUMMARY OF THE INVENTION

The present invention is based in part on the discovery that lithium ion electrochemical cells demonstrating expectedly superior performance can be fabricated by employing anodes comprising a carbon composition containing particles of different morphologies. Furthermore, it has been demonstrated that anodes comprising graphites having platelet and microbead-type morphologies have superior structural integrity vis-a-vis anodes that contain solely or predominantly of the platelet-type graphite.

In one aspect, the invention is directed to an electrochemical cell comprising:
an anode comprising a carbon mixture comprising materials selected from the group consisting of platelet particles, microbead particles, fibrous particles, and mixtures thereof;
a cathode; and
a polymer layer containing an electrolyte solution that is interposed between the anode and cathode.

In another aspect, the invention is directed to a method of fabricating an electrochemical cell comprising the steps of:
(a) providing an anode comprising materials selected from the group consisting of platelet particles, microbead particles, fiber particles, and mixtures thereof;
(b) providing a cathode; and
(c) forming a polymeric layer containing an electrolyte solution that is interposed between said anode and said cathode.

Among the important features of the invention are that: (1) the anode has a specific electrode capacity of greater than 300 mAh/g, (2) the electrochemical cell has a cycle life of greater than 1000 cycles, and (3) the electrochemical cell has a first cycle capacity loss of only about 5–15%, where the first cycle capacity loss (%) =

$$\frac{(\text{first cycle charge capacity} - \text{first cycle discharge capacity}) \times 100\%}{\text{first cycle charge capacity}}$$

BRIEF DESCRIPTION OF THE DRAWINGS

FIGS. 1A and 1B and 2A and 2B graphically illustrate the recharge ratio and discharge capacity ratio, respectively vs. cycle number for electrochemical cells.

FIGS. 3 and 4 display the differential capacity during cell charge and discharge vs. cell voltage for an electrochemical cell.

FIGS. 5 and 6 display the cumulative capacity vs. the cell voltage over a complete charge/discharge cycle for electrochemical cells.

DETAILED DESCRIPTION OF THE PREFERRED EMBODIMENTS OF THE INVENTION

The present invention is based in part on the discovery that employing a mixture of intercalation carbon anode materials having different morphologies can improve the mechanical and structural properties of anodes in solid electrochemical cells. Suitable mixtures are formed from carbon particles having platelet, microbead (or spherical), and fibrous structures. In addition, suitable carbon materials can have different levels of graphitization. In general carbon having a high level of graphitization has a more ordered microstincture more closely resembling graphite. Preferred intercalation carbon materials comprise synthetic graphite and graphitized carbons as further described below.

Anodes of the present invention can be employed in rechargeable electrochemical devices, particularly solid electrochemical cells and batteries, that include: a cathode, an intercalation based carbon anode comprising the inventive mixture, with each electrode capable of reversibly incorporating (i.e., intercalating) an alkali metal ion, and a polymeric matrix containing an organic solvent and a salt of the alkali metal. Particularly preferred electrochemical cells and batteries use lithium and salts thereof.

The anode of the present invention generally comprises an anode film that is laminated onto one or both sides of the current collector which is a thin metal foil or grid. Typically, each anode film is from about 100 μm to about 250 μm in thickness, preferably about 110 μm to about 200 μm, and more preferably about 125 μm to about 175 μm.

Similarly, the cathode of the present invention generally comprises a cathode film that is laminated onto one or both sides of the cathode current collector which is a thin metal foil or grid. Typically, each cathode film is from about 100

μm to about 200 μm in thickness, preferably about 130 μm to about 175 μm, and more preferably about 140 μm to about 165 μm. The anode and cathode each also includes a current collector that comprises, for example, a screen, grid, expanded metal, woven or non-woven or knitted wire fabric formed from an electron conductive material such as metals or alloys. Preferably, the current collector has a thickness from about 100 μm to about 250 μm, preferably about 110 μm to about 200 μm, and more preferably about 125 μm to about 175 μm. Each current collector is also connected to a current collector tab which extends from the edge of the current collector. In batteries comprising multiple electrochemical cells, the anode tabs are preferably welded together and connected to a nickel lead. The cathode tabs are similarly welded and connected to a lead. External loads can be electrically connected to the leads. Current collectors and tabs are described in U.S. Pat. Nos. 4,925,752, 5,011,501, and 5,326,653, which are incorporated herein.

However, prior to describing this invention in further detail, the following terms will be defined.

The term "plasticizer" refers to an organic solvent, with limited solubility of polymers, that facilitates the formation of porous polymeric structures. By "porous structure" is meant that upon extraction of the plasticizer the polymer remains as a porous mass. Suitable plasticizers have high boiling points typically from about 100° C. to about 350° C. A number of criteria are important in the choice of plasticizer including compatibility with the components of the electrochemical cell precursor, processability, low polymer solubility and extractability liquid solvents (e.g., diethyl ether) or by dense gases for example. Preferred plasticizers include, for example, dibutyl phthalate, dioctylphthalate, and acetates, glymes, and low molecular weight polymers.

In operation, the plasticizer is first well mixed with a polymer. Thereafter the plasticizer is removed by extraction and in the process the porous structure is formed. Preferably the weight ratio of plasticizer to polymer is from about 1 to about 50, more preferably about 10 to about 30, and most preferably about 20 to about 25.

The term "electrochemical cell precursor" or "electrolytic cell precursor" refers to the structure of the electrochemical cell prior to the addition of the inorganic salt and electrolyte solution. The precursor typically comprises (each in precursor form) an anode, a cathode, and polymeric matrix. The anode and/or cathode may each include a current collector. The polymeric matrix can function as a separator between the anode and cathode.

The term "activation" refers to the placement of an inorganic salt and electrolyte solvent into the porous portions of an electrochemical cell precursor. After activation, the electrochemical cell is charged by an external energy source prior to use.

The term "electrolytic cell" or "electrochemical cell" refers to a composite containing an anode, a cathode and an ion-conducting electrolyte interposed therebetween.

The term "battery" refers to two or more electrochemical cells electrically interconnected in an appropriate series/parallel arrangement to provide the required operating voltage and current levels.

The term "solid polymeric matrix" refers to an electrolyte compatible material formed by polymerizing an inorganic or organic monomer (or partial polymer thereof) and which, when used in combination with the other components of the electrolyte, renders the electrolyte solid. Suitable solid polymeric matrices are well known in the art and include solid matrices formed from inorganic polymers, organic polymers or a mixture of organic polymers with inorganic non-polymeric materials. The solid polymeric matrix is an organic matrix derived from a solid matrix forming monomer and from partial polymers of a solid matrix forming monomer. See, for example, U.S. Pat. No. 4,925,751, which is incorporated herein.

Alternatively, the solid polymeric matrix can be used in combination with a non-polymeric inorganic matrix. See, for example, U.S. Pat. No. 4,990,413, which is incorporated herein by reference in its entirety. Suitable non-polymeric inorganic materials for use in conjunction with the solid polymeric matrix include, by way of example, β-alumina, silver oxide, lithium iodide, and the like. Suitable inorganic monomers are also disclosed in U.S. Pat. Nos. 4,247,499, 4,388,385, 4,414,607, 4,394,280, 4,432,891, 4,539,276, and 4,557,985 each of which is incorporated herein by reference.

The term "a solid matrix forming monomer" refers to inorganic or organic materials which in monomeric form can be polymerized, preferably in the presence of an inorganic ion salt, and a solvent mixture of an organic carbonate and a glyme compound, to form solid matrices which are suitable for use as solid electrolytes in electrolytic cells. Suitable solid matrix forming monomers are well known in the art and the particular monomer employed is not critical. The solid matrix forming monomers may also comprise heteroatoms capable of forming donor acceptor bonds with inorganic cations (e.g., alkali ions).

Examples of suitable organic solid matrix forming monomers include, by way of example, propylene oxide, ethyleneimine, ethylene oxide, epichlorohydrin, acryloyl-derivatized polyalkylene oxides (as disclosed in U.S. Pat. No. 4,908,283), urethane acrylate, vinyl sulfonate polyalkylene oxides (as disclosed in U.S. Pat. No. 5,262,253, which patent is incorporated herein by reference in its entirety), and the like as well as mixtures thereof. Examples of suitable inorganic solid matrix forming monomers include, by way of example, phosphazenes and siloxanes. Phosphazene monomers and the resulting polyphosphazene solid matrix are disclosed by Abraham et al., Proc. Int. Power Sources Symp., 34th, pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized, preferably in the presence of a solvent, such as, a mixture of organic carbonate(s) to form solid polymeric matrices which are suitable for use as solid electrolytes in electrolytic cells.

The term "cured" or "cured product" refers to the treatment of the solid matrix forming monomer or partial polymer thereof under polymerization conditions (including cross-linking) so as to form a solid polymeric matrix. Suitable polymerization conditions are well known in the art and include by way of example, heating the monomer, irradiating the monomer with UV light, electron beams, and the like. The resulting cured product preferably contains repeating units containing at least one heteroatom such as oxygen or nitrogen which is capable of forming donor acceptor bonds with inorganic cations (alkali ions). Examples of suitable cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the salt, solvent and, optionally, a viscosifier. For example, a composition comprising requisite amounts of the monomer or partial polymer, salt, organic carbonate solvent and viscosifier can be applied to a substrate and then cured. Alternatively, the monomer or partial polymer can be first cured and then dissolved in a suitable volatile solvent. Requisite amounts of the salt, organic carbonate solvent and viscosifier can then be added. The mixture is then placed on a substrate and cured; removal of the volatile solvent would result in the formation of a solid electrolyte. In either case, the resulting solid electrolyte would be a homogeneous, single phase product which is maintained upon curing, and does not readily separate upon cooling to temperatures below room temperature.

Alternatively, the solid polymeric matrix can be formed by a casting process which does not require the use of monomers or prepolymers, that is, no curing is required. A preferred method employs a copolymer of polyvinylidenedifluoride and hexafluoropropylene dissolved in acetone or other suitable solvent(s). Upon casting the solution, the solvent is evaporated to form the solid polymeric matrix. The solution may be casted directly onto a current collector. Alternatively, the solution is casted onto a substrate, such as a carrier web, and after the solvent (e.g., acetone) is removed, an electrode film is formed thereon.

The term "salt" refers to any salt, for example, an inorganic salt, which is suitable for use in a non-aqueous electrolyte. Representative examples of suitable inorganic ion salts are alkali metal salts of less mobile anions of weak bases having a large anionic radius. Examples of such anions are $I^-$, $Br^-$, $SCN^-$, $ClO^-_4$, $BF^-_4$, $PF^-_6$, $AsF^-_6$, $CF_3COO^-$, $CF_3SO^-_3$, $N(SO_2CF_3)^-_2$, and the like. Specific examples of suitable inorganic ion salts include $LiClO_4$, $LiSCN$, $LiBF_4$, $LiAsF_6$, $LiCF_3SO_3$, $LiPF_6$, $(CF_3SO_2)2NLi$, $(CF_3SO_2)_3CLi$, NaSCN, and the like. The inorganic ion salt preferably contains at least one cation selected from the group consisting of Li, Na, Cs, Rb, Ag, Cu, Mg and K.

The electrolyte typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The term "compatible electrolyte solvent" or "electrolytic solvent," or in the context of components of the non-aqueous electrolyte, just "solvent," is a low molecular weight organic solvent added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery. Typical examples of solvent are mixtures of such materials as dimethyl carbonate, diethyl carbonate, propylene carbonate, ethylene carbonate, methyl ethyl carbonate, gamma-butyrolactone, triglyme, tetraglyme, dimethylsulfoxide, dioxolane, sulfolane, and the like. When using propylene carbonate based electrolytes in an electrolytic cell with graphite anodes, a sequestering agent, such as a crown ether, is added in the electrolyte.

For electrochemical cells where (1) the cathode comprises lithiated cobalt oxides, lithiated manganese oxides, lithiated nickel oxides, $Li_xNi_{1-y}Co_yO_2$, where x is preferably about 1 and y is preferably 0.1–0.9, $LiNiVO_4$, or $LiCoVO_4$, and (2) the anode comprises carbon, the electrolytic solvent preferably comprises a mixture of ethylene carbonate and dimethyl carbonate. For electrochemical cells where the cathode comprises vanadium oxides, e.g., $V_6O_{13}$ and the anode is lithium, the electrolytic solvent preferably comprises a mixture of propylene carbonate and triglyme.

The term "organic carbonate" refers to hydrocarbyl carbonate compounds of no more than about 12 carbon atoms and which do not contain any hydroxyl groups. Preferably, the organic carbonate is an aliphatic carbonate and more preferably a cyclic aliphatic carbonate.

Suitable cyclic aliphatic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2-one; 1,3-dioxan-2-one; 4,4-dimethyl-1,3-dioxan-2-one; 5,5-dimethy-1-1,3-dioxan-2-one; 5-methyl-1,3-dioxan-2-one; 4-methyl-1,3-dioxan-2-one; 5,5-diethyl-1,3-dioxan-2-one; 4,6-dimethyl-1,3-dioxan-2-one; 4,4,6-trimethyl-1, 3-dioxane-2-one; and spiro (1,3-oxa-2-cyclohexanone-5',5',1',3'-oxa-2'-cyclohexanone).

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-α,β-diol (dihydroxy alkanes having hydroxyl substituents on adjacent carbon atoms) or an alkane-α,-γ-diol (dihydroxy alkanes having hydroxyl substituents on carbon atoms in a 1,3 relationship) yields an cyclic aliphatic carbonate for use within the scope of this invention. See, for instance, U.S. Pat. No. 4,115,206, which is incorporated herein by reference in its entirety.

Likewise, the cyclic aliphatic carbonates useful for this invention may be prepared by transesterification of a suitable alkane-α,β-diol or an alkane-α,γ-diol with, e.g., diethyl carbonate under transesterification conditions. See, for instance, U.S. Pat. Nos. 4,384,115 and 4,423,205 which are incorporated herein by reference in their entirety. Additional suitable cyclic aliphatic carbonates are disclosed in U.S. Pat. No. 4,747,850 which is also incorporated herein by reference in its entirety.

The term "viscosifier" refers to a suitable viscosifier for solid electrolytes. Viscosifiers include conventional viscosifiers such as those known to one of ordinary skill in the art. Suitable viscosifiers include film forming agents well known in the art which include, by way of example, polyethylene oxide, polypropylene oxide, copolymers thereof, and the like, having a number average molecular weight of at least about 100,000, polyvinylpyrrolidone, carboxymethylcellulose, and the like. Preferably, the viscosifier is employed in an amount of about 1 to about 10 weight percent and more preferably at about 2.5 weight percent based on the total weight of the electrolyte composition.

The anode typically comprises a compatible anodic material which is any material which functions as an anode in a solid electrolytic cell. Such compatible anodic materials are well known in the art and include, by way of example, lithium, lithium alloys, such as alloys of lithium with aluminum, mercury, manganese, iron, zinc, intercalation based anodes such as those employing carbon, tungsten oxides, and the like. Preferred anodes include lithium intercalation anodes employing carbon materials such as graphite, cokes, mesocarbons, and the like. Such carbon intercalation based anodes typically include a polymeric binder and extractable plasticizer suitable for forming a bound porous composite having a molecular weight of from about 1,000 to 5,000,000. Examples of suitable polymeric binders include EPDM (ethylene propylene diamine termonomer), PVDF (polyvinylidene difluoride), EAA (ethylene acrylic acid copolymer), EVA (ethylene vinyl acetate copolymer), EAA/EVA copolymers, and the like. The anode may also include an electron conducting material such as carbon black.

Anodes of the present invention employ a mixture of carbon particles having a platelet, microbead, and/or fibrous structures.

With respect to morphology of the particles, platelet particles preferably have an aspect ratio of about 5:1 and more preferably of about 10:1. Suitable platelet particles have lengths preferably ranging from about 4 µm to 50 µm, and more preferably from about 7 µm to 25 µm and have thicknesses ranging from about 0.8 µm to 10 µm, and more preferably from about 1.4 µm to 2 µm. Preferred platelet particles have lengths of about 15 µm and thicknesses of about 1.5 µm.

A preferred carbon platelet composition comprises graphite particles with a size distribution wherein essentially all of the graphite particles are less than 48 µm in size, and preferably wherein at least 90% (wt) of the particles are less than 16 µm, and more preferably wherein at least about 94% of the particles are of less than 16 µm in size, and wherein $d_{50}$ is about 8.1 µm. $d_{50}$ is defined as the median size of the graphite particles.

The crystallinity of the graphite is such that the crystallite height $L_c$ (i.e., coherence length) is at least 100 nm and preferably greater than 120 nm and the interlayer distance $d_{002}$ is about 3.354 Å to 3.358 Å and more preferably about 3.355 Å. The density of the graphite particles is preferably about 2.25 to about 2.265, more preferably about 2.26 g/cm$^3$. The specific surface area of the graphite, as determined by the Brunauer-Emmett-Teller or "BET" method, is preferably about 6 to about 12, and more preferably is about 8.8 m$^2$/g. The graphite contains less than about 0.15% (wt) ash, more preferably less than about 0.1%. Most preferably the graphite is anisotropic, which means that its fundamental physical properties (e.g., electronic resistivity) varies with direction. Platelet-type graphite having the above physical characteristics and suitable for use in the graphite mixture is available as a synthetic graphite under the designation SFG-15™ from Lonza G & T, Ltd. (Sins, Switzerland). This particular graphite has high anistropy similar to natural graphite so that it has good compressibility and high electrical conductivity.

With respect to the microbead particles, they generally have spherical structures that form close-packed arrangements that have high densities and low surface areas. A preferred microbead carbon composition comprises particles having a size distribution wherein essentially all of the particles are less than 40 µm in size, and preferably wherein at least 50% (wt) of the particles are less than 25 µm, and more preferably wherein at least about 94% of the particles are of less than 16 µm in size, and wherein $d_{50}$ is about 8.1 µm.

Preferred microbead particles comprise heat-treated mesocarbon microbeads (MCMB). Graphitization of the MCMB occurs, for example, under heat treatment at about 2800° C. (or higher) in argon atmosphere after carbonization at 1000° C. at 2.5° C./min. with soak time of 1 h under nitrogen atmosphere. Heat treated MCMBs are further described in Mabuchi et. al., J. Electrochem. Soc. Vol. 142, No. 9, 3049–51, which is incorporated herein. The charge-discharge capacities of the MCMB can be improved by heat treatment at about 700° C., for example. The charge-discharge characteristics of heat treated MCMBs are described in Mabuchi et. al., J. Electrochem. Soc. Vol. 142, No. 4, 1041–46, which is incorporated herein. A suitable heat-treated microbead mesocarbon having a diameter of approximately 25 µm and heat treated at 2800° C. is available under the designation MCMB 25–28™ from Osaka Gas Co., Japan. Preferred MCMBs have a $L_c$ of about 1.9 nm to 50 nm, interlayer distance $d_{002}$ of about 3.36 Å to 3.44 Å, and specific gravity of about 1.5 g/cm$^3$ to 2.2 g/cm$^3$.

Heat treatment causes structural changes and charge and discharge capacities changes in MCMB. Preferred MCMBs are heat treated at about 700° C. to 2800° C.

TABLE 1

| HT (°C.) | $d_{002}$(Å) | Lc (nm) | Specific Gravity g/cm$^3$ |
|---|---|---|---|
| 700 | 3.44 | 2.7 | 1.51 |
| 800 | 3.44 | 1.9 | 1.65 |
| 1000 | 3.48 | 1.9 | 1.82 |
| 1800 | 3.43 | 13.0 | 2.10 |
| 2400 | 3.38 | 32.0 | 2.15 |
| 2800 | 3.37 | 46.0 | 2.18 |

Finally, fibrous particles have a generally elongated structure preferably with a length of about 60 µm and a diameter of about 8–11 µm. Suitable fibrous particles have lengths ranging from about 3 µm to 80 µm, and more preferably about 20 µm to 65 µm and diameters ranging from 5 to 20 µm. Preferred fibrous particles comprise heat treated mesophase-pitch-based carbon fibers. Preferred carbon fibers are heat treated at about 900° C. to 3000° C. Physical properties of these carbon fibers are set forth in the following Table 2.

TABLE 2

| HT (°C.) | $d_{002}$(Å) | Lc(nm) | Surface area (m$^2$g) | Density (g/cm$^3$) |
|---|---|---|---|---|
| 900 | 3.47 | 1.8 | 4.98 | 1.85 |
| 1500 | 3.47 | 4.5 | 3.0 | 2.1 |
| 2000 | 3.44 | 13 | 2.14 | 2.17 |
| 2300 | 3.40 | 16 | 4.36 | 2.2 |
| 3000 | 3.375 | 34 | 1.8 | 2.22 |

Heat treated fibrous carbons are described in Takami, et. at., J. Electrochem. Soc., Vol 142, No. 2, 371–378, which is incorporated herein. Heat treated carbon fibers in the form of graphitized (at 3000 ° C.) mesophase-pitch based fibers are avaliable from Petoca Co., Ltd.

With respect to the MCMBs and carbon fibers, the level of graphitization in these particles will depend, in part, on the heat treatment temperatures. Higher temperatures will generally produce higher levels of graphitization.

Carbon mixtures of the present invention preferably comprise 5 to 90 (wt) % of the platelet particles, 5 to 90 (wt) % of the microbead particles, and 5 to 90 (wt) % the fibrous particles. More preferably, carbon mixtures of comprise 12.5 to 75 (wt) % of the platelet particles, 12.5 to 75 (wt) % of the microbead particles, and 12.5 to 75 (wt) % of the fibrous particles. Most preferably, mixtures comprise 25 to 50 (wt) % of the platelet graphite, 25 to 50 (wt) % of the microbead particles, and 25 to 50 (wt) % of the fibrous particles.

In a preferred embodiment, carbon mixtures of the present invention can comprise 10 to 90 (wt) % of the platelet particles and 10 to 90 (wt) % of the microbead particles and preferably 20 to 80 (wt) % of the platelet particles and 20 to 80 (wt) % of the microbead particles, and most preferably 30 to 70 (wt) % of the platelet particles and 30 to 70 (wt) % of the microbead particles.

The cathode typically comprises a compatible cathodic material (i.e., insertion compounds) which is any material which functions as a positive pole in a solid electrolytic cell. Such compatible cathodic materials are well known in the art and include, by way of example, transition metal oxides, sulfides, and selenides, including lithiated compounds thereof. Representative materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$ and $LiCoVO_4$, lithiated manganese oxides, e.g., $LiMn_2O_4$, lithiated nickel oxides, e.g., $LiNiO_2$ and $LiNiVO_4$, and mixtures thereof. Cathode-active material blends of $Li_xMn_2O_4$ (spinel) are described in U.S. Pat. 5,429,890 which is incorporated herein. The blends can include $Li_xMn_2O_4$ (spinel) and at least one lithiated metal oxide selected from $Li_xNiO_2$ and $Li_xCoO_2$ wherein $0<x \leq 2$. Blends can also include $Li_y$-α-$MnO_2$ ($0 \leq y<1$) which is $Li_yNH_4Mn_8O_{16}$ ($0 \leq y<1$) which has a hollandite-type structure. $Li_y$-α-$MnO_2$ where $0 \leq y<0.5$ is preferred. α$MnO_2$ can be synthesized by precipitation from a reaction between a $MnSO_4$ solution and $(NH_4)_2S_2O_8$ as an oxidizing agent.

Lithiation (also referred to as "prelithiation") of α$MnO_2$ can be accomplished via a solid state reaction:

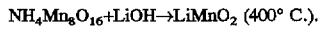

$NH_4Mn_8O_{16}$+LiOH→$LiMnO_2$ (400° C.).

Li-α-$MnO_2$ retains the same structure as Hollandite. See, Botkovitz et. al., J. of Power Sources, 43–44 (1993) 657–665, which is incorporated herein, for a discussion of the structure and electrochemical characteristics of Li-α-$MnO_2$. $Li_y$-α-$MnO_2$ $0 \leq y<0.5$ is commercially available from SEDEMA, Tertre, Belgium.

In one preferred embodiment, the compatible cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a polymeric binder to form under pressure a positive cathodic plate. Suitable binders for use in the cathode have a molecular weight of from about 1,000 to 5,000,000.

In one preferred embodiment, the cathode is prepared from a cathode paste which comprises from about 35 to 65 weight percent of a compatible cathodic material; from about 1 to 20 weight percent of an electroconductive agent; from about 1 to 20 weight percent of suitable polymeric binders that may include EPDM (ethylene propylene diene termonomer), PVDF (polyvinylidene difluoride), EAA (ethylene acrylic acid copolymer), EVA (ethylene vinyl acetate copolymer), EAA/EVA copolymers, and the like; from about 0 to about 20 weight percent of polyethylene oxide having a number average molecular weight of at least 100,000; from about 10 to 50 weight percent of solvent comprising a 10:1 to 1:4 (w/w) mixture of an organic carbonate and a glyme; and from about 5 weight percent to about 25 weight percent of a sold matrix forming monomer or partial polymer thereof. Also included is an ion conducting mount of an inorganic ion salt. Generally, the mount of the salt is from about 1 to about 25 weight percent. (All weight percents are based on the total weight of the cathode.)

The electrolyte composition typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The electrolyte composition typically comprises from 0 to about 80 weight percent electrolyte solvent (e.g., organic carbonate/glyme mixture) based on the total weight of the electrolyte; preferably from about 60 to about 80 weight percent; and even more preferably about 70 weight percent.

The electrolyte composition typically comprises from about 5 to about 30 weight percent of the solid polymeric matrix based on the total weight of the electrolyte; preferably from about 15 to about 25 weight percent.

In a preferred embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100,000. Preferably, the film forming agent is employed in an amount of about 1 to about 10 weight percent and more preferably at about 2.5 weight percent based on the total weight of the electrolyte composition.

Methodology

Electrochemical cells are known in the art. See, for example, U.S. Pat. Nos. 5,300,373, 5,316,556, 5,346,385, 5,262,253, 4,472,487, 4,668,595, and 5,028,500, all of which are incorporated herein. The inventive carbon mixture can be adapted to form anode structures for prior art electrochemical cells. The following illustrates a method of how an electrolytic cell could be fabricated with using the inventive carbon mixture. Examples 1 and 2 describe the process of preparing the anode and cathode, respectively. Example 3 describes the procedures for fabricating a solid electrolytic cell.

The invention will be described using the anode and cathode structures wherein electrode materials (or films) are laminated onto both sides of the current collectors, however, it is understood that the invention is applicable to other configurations, for example, where one side of the anode and/or cathode current collector is laminated.

EXAMPLE 1

The anode current collector employed was a sheet of expanded copper metal that is about 50 μm thick. It is available under the designation 2Cu5–125 (flatten) from Delker, in Branford, Conn.

The anode slurry was prepared as follows:

A polymer mixture comprising a copolymer of polyvinylidenedifluoride (PVDF) and hexafluoropropylene (HFP) was prepared by mixing 6.8 grams of the copolymer in 20 grams of acetone. The copolymer (ave. MW 125K) was Kynar Flex 2801™ from Elf Atochem North America, in Philadelphia, Pa. The mixture was stirred for about 24 hours in a milling jar available from VWR Scientific, in San Francisco, Calif., model H-04172-00. The copolymer functions as a binder for the carbon in the anode.

A graphite mixture was prepared separately by first adding 23.4 grams of graphite into 0.9 grams of carbon black into a solution containing 60 grams acetone, 10.5 grams dibutyl phthalate, and 0.5 grams of a surfactant. A preferred graphite comprises a 50:50 (by weight) mixture of a synthetic graphite available under the designation SFG-15™ from Lonza G & T, Ltd. (Sins, Switzerland) and graphitized mesocarbon microbeads available under the designation MCMB25-28™ from Osaka Gas Co., Japan. A preferred carbon black is available under the designation Super P™ from M. M. M. Carbon, Willebrock, Belgium. Preferred surfactants include Pluronic FC68™ from BASF, Mt. Olive, N.J. and Flurad 430™ from 3M Co. St. Paul, Minn. The surfactant disperses the graphite. The graphite mixture was then vigorously mixed in a high shear mixer until a substantially homogeneous blend was formed. A suitable mixer is available from Ross Model ME100DLX, Hauppauge, N.Y., operating at its highest setting (about 10,000 RPM) for 30 minutes.

The anode slurry was prepared by mixing the polymer mixture and the graphite mixture together under low shear conditions to form the anode slurry wherein the components are well mixed. A portion of the acetone is allowed to evaporate from the slurry before it was laminated onto each side of the current collector. Anode films form when the remaining portion of the acetone evaporates.

EXAMPLE 2

The cathode current collector employed was a sheet of expanded aluminum that is about 50 μm thick. The aluminum grid is available under the designation 2AL5-077 from Delker, in Branford, Conn.

The cathode slurry was prepared as follows:

A polymer mixture comprising a copolymer of polyvinylidenedifluoride (PVDF) and hexafluoropropylene (HFP) was prepared by mixing 4.4 grams of the copolymer in 15 ml of acetone. The copolymer was Kynar Flex 2801™. The mixture was stirred for about 24 hours in a milling jar.

A cathode mixture was prepared separately by first adding 28.9 grams of a cathode-active material blend comprising $Li_xMn_2O_4$ (spinel) ($0 \leq x < 2$) and $Li_y$-$\alpha$-$MnO_2$ ($0 \leq y < 1$) (1:1 weight ratio), 2.4 grams of carbon black (Super P™) into a solution containing 60 grams acetone, 8.7 grams dibutyl phthalate, and 0.5 grams of a surfactant. The mixture was then vigorously mixed in a high shear mixer until a substantially homogeneous blend was formed.

The cathode slurry was prepared by mixing the polymer mixture and the graphite mixture together under low shear conditions to form the anode slurry wherein the components are well mixed. A portion of the acetone is allowed to evaporate from the slurry before it was laminated onto each side of the current collector. Cathode films form when the remaining portion of the acetone evaporates.

The above anode and cathode films were formed directly on the current collector by laminating the slurry mixtures onto the current collector surfaces. Alternatively, each film can be prepared by first casting a slurry onto a substrate or carrier web and allowing the solvent to evaporate thus leaving the film. Thereafter, the films can be laminated onto each side of the current collector.

EXAMPLE 3

A solid electrochemical cell is prepared by first positioning a polymeric matrix between the anode and cathode and thereafter fusing the structures under moderate pressure and temperature (e.g., 130° C.) to form an electrochemical cell precursor. The polymeric matrix is formed by casting a polymeric slurry comprising acetone, dibutyl phthalate, silanized fumed $SiO_2$, and the PVDF/HFP copolymer on a suitable substrate or carrier web and allowing the acetone to evaporate. No curing by radiation is required. The $SiO_2$ is a filler which impart toughness and strength to the film. In addition, it is believed that the $SiO_2$ assists the activation process by creating physico-chemical conditions such that the electrolyte solution quickly and completely fills the pores created by the extraction of the dibutyl phthalate. Preferably, the polymeric slurry is mixed under low shear conditions as not to degrade the copoloymer.

Preferably in preparing the polymer mixture for both the anode and cathode slurries is that the polymer (or copolymer) not be subject to high shear so as to be degraded. Furthermore, preferably the polymer or copolymer employed has a high average molecular weight. Preferably the average molecular weight is between 50K to 750K, more preferably 50K to 200K, and most preferably 50K to 120K. Furthermore, it is preferred that polymer or copolymer has a narrow molecular weight have range. Preferably $M_n/M_w \sim 1.0$.

Next the dibutyl phthalate plasticizer is extracted from the precursor. Extraction can be accomplished using conventional organic liquid solvents such as diethyl ether or by a dense fluid or gas which refers to a gas compressed and heated to either supercritical or subcritical conditions to achieve liquid-like densities. Dense gases and fluids are known in the art. See, for example, U.S. Pat. Nos. 5,013,366, 5,267,455, 4,219,333, 4,012,194, and 3,969,196, which are incorporated herein. A preferred dense gas is carbon dioxide. The precursor is than pre-packaged in moisture-impermeable material which is described, for example, in U.S. Pat. No. 5,326,653 which is incorporated herein, before being activated. Activation preferably occurs in an inert (e.g., argon) atmosphere. Finally, the packaging of the electrochemical cell is sealed.

EXPERIMENTAL

Performance of Electrochemical Cells

Electrochemical cells containing various anode compositions fabricated generally in accordance with the procedures of the Examples 1, 2, and 3 described above were tested. Specifically, the anode carbon material comprised: (1) 100% microbead carbon particles (MCMB 25–28™) or (2) a mixture of microbead and platelet carbon particles (50% MCMB 25–28™ and 50% SFG-15™). A PVDF-HFP copolymer binder was used in each case. The cathode comprised $LiMn_2O_4$ and PVDF-HFP copolymer as the binder; and the electrolyte comprised a mixture of ethylene carbonate (EC) and dimethyl carbonate (DMC) (67:33 ratio by weight) and 1M $LiPF_6$. The EC:DMC ratio can vary between about 20:80 to about 80:20 with a significant decrease in performance. The anode, cathode, and solid electrolyte of the electrochemical cells each has a surface area of approximately 48 $cm^2$.

The recharge ratios and discharge capacities for the electrochemical cells were measured at different discharge and charge currents. For each test, the voltage limits were 2.5 volts and 4.5 volts. FIGS. 1A and 1B depict the recharge ratio and discharge capacity, respectively vs. cycle numbers for three electrochemical cells wherein the anode carbon material comprised 100% platelet particles, MCMB 25–28™. FIGS. 2A and 2B depict the recharge ratio vs. and discharge capacity, respectively vs. cycle number for five electrochemical cells wherein the anode carbon material comprised the mixture of 50% MCMB 25–28™ and 50% SFG-15™. In each case, the discharge rate was 1 mA/$cm^2$ and the charge rate was 1 mA/$cm^2$.

Data shown in FIGS. 3–6 were derived from electrochemical voltage spectroscopy (EVS) studies. Only experimental results from a single cycle (the first) of the cell is presented. EVS techniques are further discussed in J. Barker Electrochimica Acta, Vol. 40, No. 11 (1995) 1603–08.

FIG. 3 displays the differential capacity vs. cell voltage during cell charge and discharge for an electrochemical cell wherein the anode carbon material comprised 100% MCMB 25–28™. FIG. 4 displays similar data for an electrochemical cells wherein the anode carbon material comprised 50% SFG-15™ and 50% MCMB 25–28™. For FIGS. 3 and 4, the EVS data above the voltage axis represent cell charge and data below the voltage axis represent cell discharge. The experimental parameters were: −10 mV voltage steps and critical limiting current density of <0.32 mA/cm$^2$. The reversible capacities for the cells of FIGS. 3 and 4 were 212 mAh and 234 mAh, respectively. The first cycle charge inefficiency for both cells was 11%.

As is apparent, the electrochemical cell of FIG. 4 wherein the anode carbon material comprises the 50:50 mixture demonstrated a decreased voltage hysteresis between equivalent charge-discharge peaks as compared to the electrochemical cell of FIG. 3 wherein the anode carbon material consisted of only the microbead carbons.

FIG. 5 displays the cumulative capacity vs. cell voltage during cell charge (curve 10) and discharge (curve 12) for an electrochemical cells wherein the anode carbon material carbon material comprised 100% MCMB 25–28™. The specific capacities of the anode and cathode were 310 mAh/g and 105 mAh/g, respectively. FIG. 6 displays similar data for an electrochemical cells wherein the anode carbon material comprised 50% MCMB 25–28™ and 50% SFG-15™. The specific capacities of the anode and cathode were 350 mAh/g and 115 mAh/g, respectively.

As is apparent electrochemical cell of FIG. 6 wherein the anode carbon material comprises the 50:50 mixture, demonstrated a higher discharge capacity, improved anode and cathode specific capacities, and a reduced voltage hysteresis as compared to the cell of FIG. 5 wherein the anode carbon materials consisted only of the microbead carbons.

Structural Integrity of Anode Structure

An important aspect of the invention is that the anode structure remains intact. Specifically, it was found that anodes of solid electrochemical cells wherein the intercalation carbon in the anodes comprised 100% platelet particles (SFG-15™), exhibited poor cohesive and adhesive properties which result in decreased electrical contact and poor electrochemical performance. It is believed that the carbon particles, with the platelet-type structure, tend to settle in an oriented fashion when the anode slurry is coated onto the current collector.

In contrast, when the intercalation carbon in the anode comprises the inventive mixture of the platelet, microbead, and/or fiber-like carbon particles, the anode is expected to demonstrate good cohesion and adhesion characteristics so that the anode will be intact throughout the life of the electrochemical cell. Indeed, the anodes of electrochemical cells that were the subject of the experiments shown in the above figures all demonstrated good structural integrity as evidenced by the fact the cell impedance did not increase significantly during cell cycling. In addition, as evidenced by the above data, these cells also exhibited good electrochemical performance.

It is expected that lithium electrochemical cells employing the inventive anode structure will have a first cycle capacity loss of less than about 20%, preferably between about 5–15% and more preferably between about 5–10%. Furthermore, the inventive anode should have a specific electrode capacity of greater than 300 mAhr/g, and more preferably 320 mAhr/g. Finally, the inventive lithium electrochemical cells should have a cycle life at greater than 1000 cycles, and more preferably between about 1000 to about 2000 cycles. The recharge ratio of the electrochemical cell, after the first 10–20 cycles should become about 1.

While the invention has been described in terms of various preferred embodiments, the skilled artisan will appreciate the various modifications, substitutions, and changes which may be made without departing from the spirit hereof. The descriptions of the subject matter in this disclosure are illustrative of the invention and are not intended to be construed as limitations upon the scope of the invention.

What is claimed is:

1. An electrochemical cell comprising:
   an anode comprising a carbon mixture comprising carbon platelet particles and at least one carbon material selected from the group consisting of microbead particles and fibrous particles;
   a cathode; and
   a polymeric layer containing an electrolyte solution that is interposed between the anode and cathode.

2. The electrochemical cell of claim 1 wherein the platelet particles comprise particles that have an aspect ratio of about 5:1 and that have lengths ranging from about 4 to 50 µm and thicknesses ranging from about 0.8 to 10 µm.

3. The electrochemical cell of claim 2 wherein the platelet particles comprise graphite particles.

4. The electrochemical cell of claim 1 wherein the microbead particles have spherical structures with diameters ranging from about 1 to 40 µm.

5. The electrochemical cell of claim 4 wherein the microbead particles comprise heat-treated mesocarbon microbeads that have been heat treated at about 700° to 2800° C.

6. The electrochemical cell of claim 1 wherein the fibrous particles have elongated structures with lengths ranging from about 3 to 80 µm and diameters ranging from about 5 to 20 µm.

7. The electrochemical cell of claim 6 wherein the fibrous particles comprise mesophase-pitch-based carbons fibers that have been heat treated at about 900° to 3000° C.

8. The electrochemical cell of claim 1 wherein the carbon mixture comprises platelet particles and microbead particles.

9. The electrochemical cell of claim 1 wherein the carbon mixture comprises 5 to 90% platelet particles, 5 to 90% microbead particles, and 5 to 90% fibrous particles, all percentages by weight.

10. The electrochemical cell of claim 1 wherein the anode has a specific electrode capacity of greater than 300 mAh/g.

11. The electrochemical cell of claim 1 wherein the carbon mixture comprises carbon platelet particles and fibrous particles.

12. The electrochemical cell of claim 11 wherein the platelet particles comprise graphite particles.

13. A method of fabricating an electrochemical cell comprising the steps of:
   (a) providing an anode comprising a carbon mixture comprising carbon platelet particles and at least one carbon material selected from the group consisting of microbead particles and fibrous particles;
   (b) providing a cathode; and
   (c) forming a polymeric layer containing an electrolyte solution that is interposed between said anode and said cathode.

14. The method of claim 13, wherein the platelet particles comprise particles that have an aspect ratio of about 5:1 and that have lengths ranging from about 4 to 50 μm and thicknesses ranging from about 0.8 to 10 μm.

15. The method of claim 14 wherein the platelet particles comprise graphite particles.

16. The method of claim 13 wherein the microbead particles have spherical structures with diameters ranging from about 1 to 40 μm.

17. The method of claim 16 wherein the microbead particles comprise heat-treated mesocarbon microbeads that have been heat treated at about 700° to 2800° C.

18. The method of claim 13 wherein the fibrous particles have elongated structures with lengths ranging from about 3 to 80 μm and diameters ranging from about 5 to 20 μm.

19. The method of claim 18 wherein the fibrous particles comprise mesophase-pitch-based carbons fibers that have been heat treated at about 900° to 3000° C.

20. The method of claim 13 wherein the carbon mixture comprises platelet particles and microbead particles.

21. The method of claim 13 herein the carbon mixture comprises 5 to 90% platelet particles, 5 to 90% microbead particles, and 5 to 90% fibrous particles, all percentages by weight.

22. The method of claim 13 wherein the anode has a specific electrode capacity of greater than 300 mAh/g.

23. The method of claim 13 wherein the carbon mixture comprises carbon platelet particles and fibrous particles.

24. The method of claim 23 wherein the platelet particles comprise graphite particles.

* * * * *